(12) United States Patent
Zondervan et al.

(10) Patent No.: US 6,516,327 B1
(45) Date of Patent: Feb. 4, 2003

(54) SYSTEM AND METHOD FOR SYNCHRONIZING DATA IN MULTIPLE DATABASES

(75) Inventors: Quinton Yves Zondervan, Boston, MA (US); Alexandre J. Lee, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,800

(22) Filed: Sep. 24, 1999

Related U.S. Application Data
(60) Provisional application No. 60/113,941, filed on Dec. 24, 1998.

(51) Int. Cl.[7] .............................................. G06F 17/30
(52) U.S. Cl. ................. 707/200; 707/201; 707/202; 707/203; 707/204; 707/205
(58) Field of Search ............................ 707/10, 200–205

(56) References Cited

U.S. PATENT DOCUMENTS

| | | | |
|---|---|---|---|
| 5,136,707 A | 8/1992 | Block et al. | |
| 5,142,470 A | 8/1992 | Bristow et al. | |
| 5,404,488 A | 4/1995 | Kerrigan et al. | |
| 5,434,994 A | 7/1995 | Shaheen et al. | |
| 5,537,585 A | 7/1996 | Blickenstaff et al. | |
| 5,602,992 A | 2/1997 | Danneels | |
| 5,664,228 A | 9/1997 | Mital | |
| 5,666,530 A | 9/1997 | Clark et al. | |
| 5,684,989 A | 11/1997 | Nissato | |
| 5,710,922 A | 1/1998 | Alley et al. | |
| 5,721,914 A | 2/1998 | De Vries | |
| 5,727,202 A | 3/1998 | Kucala | |
| 5,729,735 A | 3/1998 | Meyering | |
| 5,740,230 A | 4/1998 | Vaudreuil | |
| 5,758,150 A | 5/1998 | Bell et al. | |
| 5,758,355 A | 5/1998 | Buchanan | |
| 5,761,500 A | 6/1998 | Gallant et al. | |
| 5,796,999 A | * 8/1998 | Azagury et al. | ............. 707/201 |
| 5,829,001 A | 10/1998 | Li et al. | |
| 5,867,688 A | 2/1999 | Simmon et al. | |
| 5,870,733 A | 2/1999 | Bass et al. | |
| 5,924,096 A | * 7/1999 | Draper et al. | .................. 707/10 |
| 5,926,816 A | * 7/1999 | Bauer et al. | .................... 707/8 |
| 5,991,771 A | * 11/1999 | Falls et al. | .................... 707/202 |
| 6,266,669 B1 | * 7/2001 | Brodersen et al. | ............. 707/10 |

OTHER PUBLICATIONS

*EMA Directory Resource Center*, May 4, 1998, 3 pages.

(List continued on next page.)

*Primary Examiner*—Jean M. Corrielus
*Assistant Examiner*—Cam Y T Truong
(74) *Attorney, Agent, or Firm*—Mintz Levin Cohn Ferris Glovsky and Popeo PC

(57) ABSTRACT

A system, method, and processor readable medium containing code for causing a processor to synchronize a secondary database system, such as one stored on a palmtop electronic device, with a distributed database system, comprising a main database and at least one replica database. The system further comprises a modification module that contains entries for modifications that have been made to the secondary database since a previous synchronization between the secondary database and the distributed database system and a synchronization module that synchronizes the secondary database with one of the databases of the distributed database system using the modification module. Each database in the distributed database system stores an identification mapping database having an assigned version number. The system further comprises a replica identification database associated with the secondary database that contains an entry for each source database of the distributed database system, each entry comprising information regarding the last synchronization between the secondary database and the source database including the version of the identification mapping database associated with the source database when the synchronization occurred. A pruning module is provided for pruning entries from the modification module using the replication identification database.

22 Claims, 11 Drawing Sheets

OTHER PUBLICATIONS

*EMA Directory Resource Center: Electronic Directory References*, May 4, 1998, 2 pages.
*EMA Directory Resource Center, Production and Test Directories*, May 4, 1998, 1 page.
*EMA Directory Resource Center, Electronic Directory Vendors*, May 4, 1998, 1 page.
*Lotus Notes of Jan. 23, 1997*, May 4, 1998, 3 pages.
*Defense Message System—Army*, May 4, 1998, 2 pages.
*What is DMS?*, May 4, 1998, 4 pages.
*Lotus Notes DMS Nears Completion of GOSIP Product Testing*, dated Jun. 4, 1996, 3 pages.
*DISA, JITC Registers for GOSIP/POSIT and DMS*, May 4, 1998, 3 pages.
*Defense Message System (DMS) Public Web Site*, May 4, 1998, 1 page.
*What's New at DISA?*, May 4, 1998, 2 pages.
*More About DMS*, May 4, 1998, 1 page.
*Defense Message System*, May 4, 1998, 2 pages.
*Lockheed Martin DMS Overview*, May 4, 1998, 1 page.
*Lockheed Martin DMS Product Information*, May 4, 1998, 1 page.
*Lockheed Martin DMS Products and Services*, May 4, 1998, 2 pages.
*DMS System Manual 1.0*, May 3, 1997, by Lockheed Martin Federal Systems, 371 pages.
Sara Radicati, *X.500 Directory Services: Technology and Deployment*, 1994, entire book.

* cited by examiner

| 62a | MDID #2 | SDID #2 | ACTION FLAG |
| --- | --- | --- | --- |
| 62b | MDID #4 | SDID #3 | ACTION FLAG |

| 54 | ⋮ |
| --- | --- |
| | DELTA TABLE VERSION NUMBER |
| | DELTA TABLE |

FIG. 5A

| | | | |
| --- | --- | --- | --- |
| 64a | REPLICA A | ID MAPPING TABLE VERSION # | TIME SYNC LAST |
| 64b | REPLICA B | ID MAPPING TABLE VERSION # | TIME SYNC LAST |
| 64n | REPLICA C | ID MAPPING TABLE VERSION # | TIME SYNC LAST |

58

⋮

REPLICA ID TABLE

FIG. 5B

SYSTEM AND METHOD FOR SYNCHRONIZING DATA IN MULTIPLE DATABASES

This application claims the benefit of Provisional Application No. 60/113,941, filed Dec. 24, 1998.

FIELD OF THE INVENTION

This invention relates to a system and method for synchronizing data in a subset database with a distributed database system.

BACKGROUND OF THE INVENTION

In recent years, small electronic devices with reasonable amounts of memory, faster processing power, and extendible operating systems have become extremely popular as well as affordable. These electronic devices are popular for situations when a personal computer or even a notebook computer is to not convenient. Such electronic devices may operate electronic calendar programs, electronic personal organizer programs, user application programs, and other programs that may also be operable on larger computer systems. Such electronic devices may have databases for storing information for use by such programs, including calendar information, contact information, lists of tasks to be performed, files, data, pictures, bitmaps, and other information that may be stored in a database.

Many users of these electronic devices use a personal computer, notebook computer or networked computer as well. Some users may use an electronic device, a notebook computer, and a networked personal computer, each for different tasks or situations. Accordingly, these users may desire to have some information stored in each computer system. For example, a user may desire to store a copy of a contact information database, a company directory database, or a database of program files on the electronic device and another computer system as well, such as, for example, a notebook computer, stand-alone personal computer, or a networked computer system.

As chances are made to one database, it may be desired that the same changes be reflected in the other databases as well. For example, if new personnel are added or existing contact information is changed in a distributed database company directory, the user may desire to have those same changes reflected in the company directory database stored in the user's electronic device. Similarly, if the user adds contact information into the contact database stored on the user's electronic device, the user may desire to have that information added to the contact database stored on a distributed database system.

Some current electronic devices and computer systems permit users to perform a two-way batch transfer of data between a single source database on a computer system and the electronic device database. These systems suffer from various drawbacks.

Such systems do not enable a user to transfer data with distributed database systems. Distributed database systems such as the distributed database system licensed by Lotus Development Corporation under the trade name Lotus Notes™, for example, provide a system that distributes multiple copies of databases through a networked system to enable more efficient and faster access to information contained in the databases. These systems provide for replication of information between the various copies of the database. Current electronic devices are not capable of properly synchronizing with a distributed database system.

Further, memory constraints on these electronic devices often prevent copies of large databases. Distributed databases as well as some other databases may exceed the storage capacity of an electronic device.

Other drawbacks also exist with current systems.

SUMMARY OF THE INVENTION

Accordingly, it is an object of the present invention to overcome these and other drawbacks of current systems.

It is an object of the present invention to facilitate use of electronic devices with distributed database systems.

It is another object of the present invention to enable a user to store data on multiple databases and allow the user to synchronize the data across those multiple databases.

It is an object of the present invention to provide a system and method for allowing a user to store information from a distributed database system on a portable electronic device and synchronize that information periodically.

It is an object of the present invention to provide a system and method for storing a subset of a database on a electronic device and enabling data stored in that subset to be synchronized with the data contained in the database.

It is an other object of the present invention to provide a system and method for synchronizing data between a subset database and a distributed database system.

According to these and other objects of the present invention, a system, method, and computer readable medium containing instructions for causing a computer to synchronize data from a subset database with a distributed database is provided. The system may comprise one or more source systems and one or more secondary systems. According to one embodiment, the secondary system may comprise a portable electronic device or another device that has limited memory relative to the source system.

The source system may comprise a notebook computer, personal computer or network computers, for example, and may access one or more source databases from a distributed database system. The secondary system may access a secondary database which is a subset of one or more of the databases from the distributed database system. To synchronize data between the secondary database and one of the source databases, the source system may store a mapping identification table that identifies correspondence between records in the distributed database and records in the subset database. According to one embodiment, the mapping identification table may contain one-to-one correspondence between every record in the subset database and a record from the distributed database. The secondary system may also store a delta table which may contain information about modifications to the secondary database. Further, for systems in which the distributed database comprises a source database and one or more replica databases, the secondary source may store a replica identification table that contains information regarding which replica of the source database is most up to date. This information may be used during synchronization to ensure that updates are made to the most up-to-date version of the database before they are changed. This information may be used to ensure accurate synchronization of data between the secondary database and the source database.

According to another embodiment of the present invention, a system, method, and computer readable medium containing computer readable instructions for causing a computer to synchronize a secondary database system, such as one stored on a palmtop electronic device, with a distributed database system. The distributed database system comprises a main database and at least one replica database. The system further comprises a modification database that contains entries for modifications that have been made to the secondary database since a previous synchronization between the secondary database and the distributed database system and a synchronization module that synchronizes the secondary database with one of the databases of the distributed database system using the modification database. Each database in the distributed database system stores an identification mapping database having an assigned version number. The system further comprises a replica identification database associated with the secondary database that contains an entry for each source database of the distributed database system, each entry comprising information regarding the last synchronization between the secondary database and the source database including the version of the identification mapping database associated with the source database when the synchronization occurred. A pruning module is provided for pruning entries from the modification database using the replication identification database.

Other advantages of the present invention will be apparent from reviewing the detailed description and drawings of the present invention set forth herein.

BRIEF DESCRIPTION OF THE DRAWINGS

FIG. 5(a) depicts a delta table according to one embodiment of the present invention.

FIG. 5(b) depicts a replica identification table according to one embodiment of the present invention.

DETAILED DESCRIPTION OF THE PRESENT INVENTION

According to one embodiment of the present invention, a system, method and computer medium is provided for synchronizing data between a database stored on an electronic device and a distributed database system. For illustration, a system according to one embodiment of the present invention is provided in FIG. 1.

Figure 1:
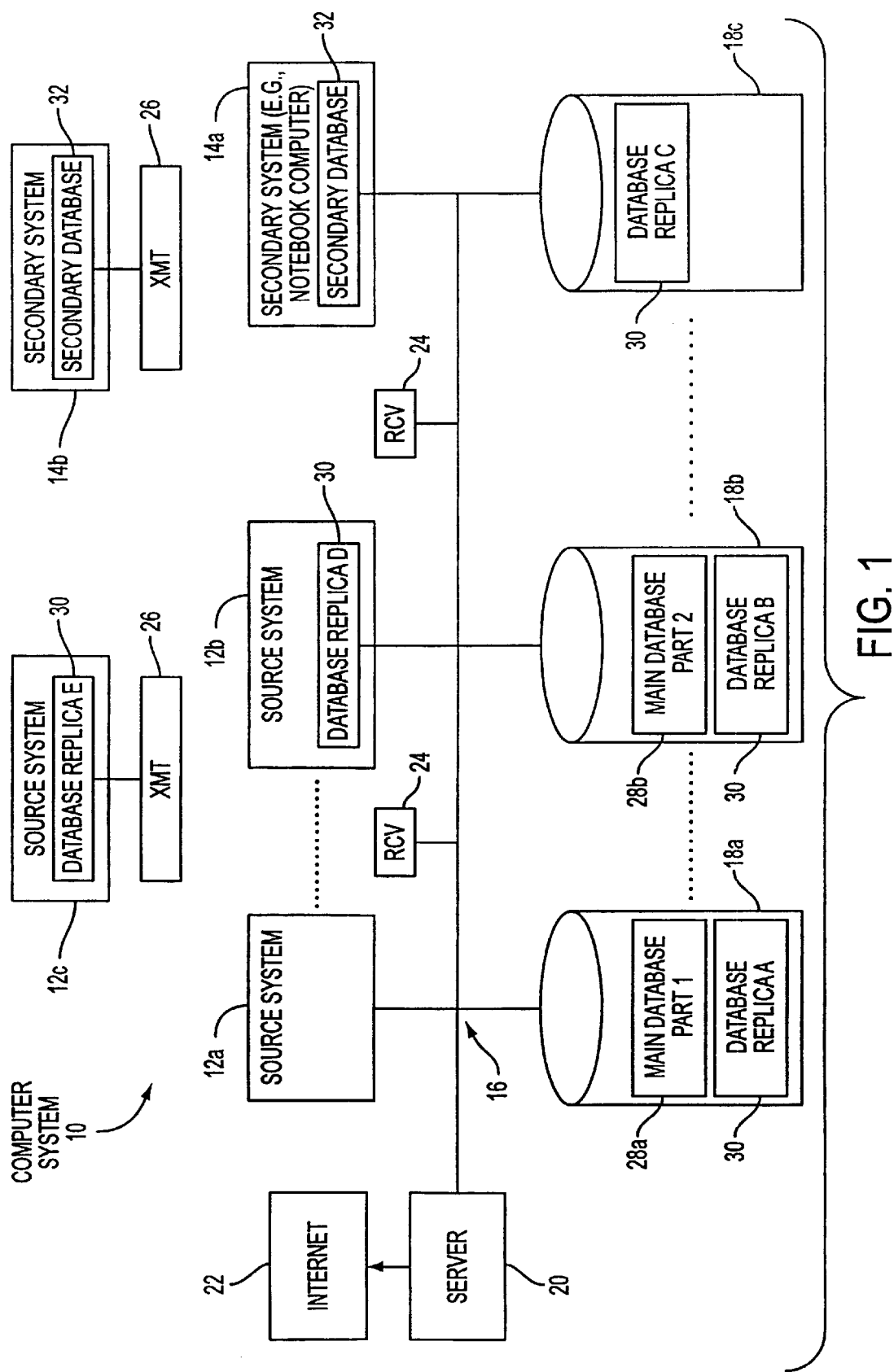
FIG. 1 is a computer system according to one embodiment of the present invention.

A computer system according to one embodiment of the present invention is depicted in FIG. 1. Computer system 10 may comprise a plurality of source systems 12, secondary systems 14, data storage mechanisms 18, servers 20, receivers 24 and transmitters 26. These components of computer system 10 may be connected over a network 16. Additionally, server 20 may enable access to internet resources 22. Computer system 10 may also comprise a main database 28, replica databases 30 and secondary databases 32. As depicted in FIG. 1, main database 28 may be stored across one or more data storage mechanisms 18. Main database 28 may also be stored on a single database mechanism 18. Additionally, multiple replica databases 30 may be provided in computer system 10. As depicted in FIG. 1, for example, replica databases 30 may be stored on one or more data storage mechanism 18 or directly within source system 12.

According to one embodiment of the present invention, source systems 12 may comprise a personal computer, a notebook computer, a main frame computer or any other computer system that enables access to data stored on a database. Source system 12 may be connected to other components of computer system 12 via network 16. As depicted in FIG. 1, a source system 12 may be provided that may be connected via a transmitter and receiver 26 and 24 so that source system 12 may be remotely located from other components of computer system 10.

Secondary system 14 may comprise a notebook computer, an electronic portable device, or any other type of computer system that is capable of storing data. According to one embodiment of the present invention, secondary system 14 may comprise less memory than source system 12. Secondary system 14 may be directly connected via network 16 to the rest of the components of computer system 10 or may be remotely located and connected via transmitter 26 and receiver 24. Also, it may be preferred that secondary system be portable and therefore secondary system 14 may be disconnectable from network 16 and may be periodically reconnected to network 16 as desired by the user for access to the other components of computer system 10 as described in more detail below. Secondary system 14 may preferably comprise sufficient memory to store secondary database 32.

Network 16 may comprise any network capable of connecting multiple computer components together. For example, network 16 may comprise an intranet, LAN, WAN, or any other computer network arrangement. Additionally, network 16 may comprise any type of medium for connecting data across a network. For example, network 16 may comprise telephone line, cable, fiberoptic cable, microwave transmission, radio frequency transmission, satellite transmission, or any other media for transmitting data between points. Network 16 should thus be interpreted very broadly to include all types of data transmission without being limited to a specific embodiment.

Data storage mechanisms 18 may comprise any mechanism for storing data. For example, data storage mechanism 18 may comprise read only memory, random access memory, CD ROM, floppy disks, digital tape, cache, or any other data storage mechanism. Data storage mechanisms 18 may comprise a part of source system 12 or may be remotely located from source system 12. For example, data storage mechanism 18 may comprise the hard drive of a computer system or may comprise a remotely access database system. Data storage mechanism 18 should be understood to comprise any device capable of storing data across a computer network 16 or within a computer system such as source system 12 or secondary system 14.

Server 20 may comprise one or more computer servers capable of retrieving and providing data across a computer network. According to one embodiment of the present invention, server 20 may comprise a server sold by the Lotus Development Corporation under the name Lotus Domino™. Server 20 may be capable of retrieving any data stored within data mechanisms 18, source systems 12 or secondary systems 14. Server 20 may preferably comprise a server capable of retrieving data and providing that data to internet users via internet connection 22. Other types of servers may also be provided.

Receivers 24 and transmitters 26 may be any type of receiver and transmitter capable of airwave communication of data. For example, a microwave receiver and transmitter may be used, although any other type of data transmitter may also be used for transmitting data to remotely to source systems 12 or secondary systems 14.

Main database 28 may comprise any type of database structure. According to one embodiment of the present invention, main database 28 may comprise part of a distributed database system. According to that embodiment of the present invention, main database 28 and replica databases 30 may comprise a distributed database network. According to this embodiment of the present invention, replica databases 30 may comprise a replica of the contents of main database 28. Replica databases 30 may be distributed across network 28 to various locations within data storage mechanisms 18 and source systems 12. According to one embodiment of the present invention, the distributed database system may comprise a distributed database system licensed under the name Lotus Notes™. Other distributed database systems may also be used according to the present invention.

Within the distributed database system, replica databases 30 may be periodically synchronized or replicated with main database 28 to ensure that the contents of replica databases 30 are consistent with the contents of main database 28. As different users may have access to different replicas of main database 28, different changes may occur to the various replicas. Accordingly, a system for synchronizing and replicating information from the various replicas and main database 28 may be employed according to known methods. Such methods may be, for example, those provided by the Lotus Notes™ system. Other replication methods and mechanisms may also be used to ensure accuracy and integrity of information within main database 28 and replica databases 30.

Secondary database 32 may comprise a subset of the contents of main database 28 according to one embodiment of the present invention. Because distributed database systems may be extremely large and may contain a large number of records, it may not be possible to store complete copy of main database 28 on secondary system 14. According to one embodiment of the present invention, therefore, secondary database 32 may comprise a working set or subset of main database 28 for which a user may access through secondary system 14. For example, main database 28 may comprise a company directory containing records for over 5,000 employees. A particular user of secondary system 14 may only need information about 100 of those employees. Accordingly, secondary database 32 may comprise a copy of 100 out of the 5,000 records available on main database 28. Secondary database 32 may also comprise information for a particular user which may then be replicated to main database 28.

According to one embodiment of the present invention, because changes may be made to main database 28 or secondary database 32, a method for synchronizing the contents of main database 28 and secondary database 32 may be provided according to one embodiment of the present invention.

Figure 2:
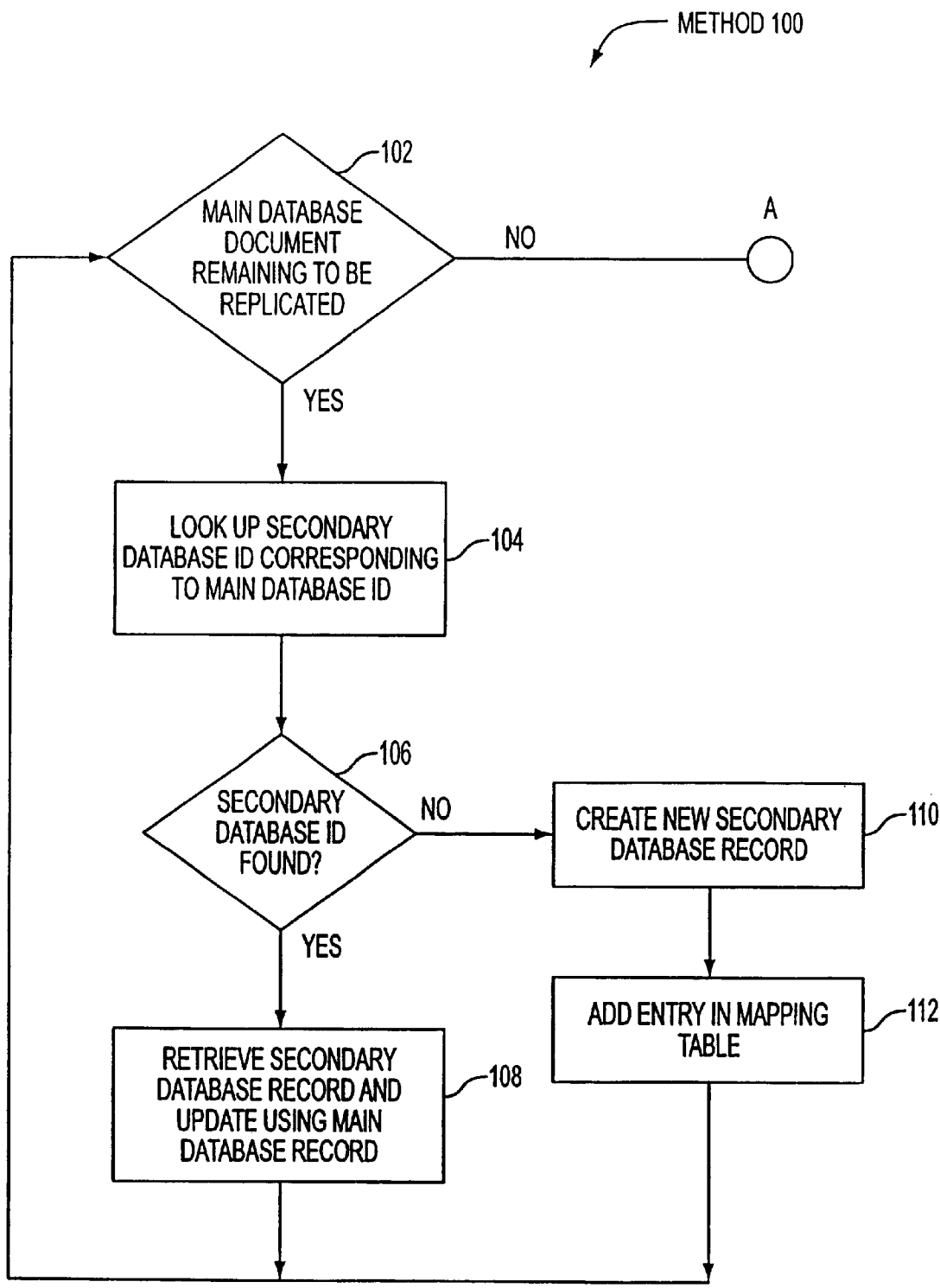
FIGS. 2 and 3 depict a flow diagram of a method of synchronization according to one embodiment of the present invention.
Figure 3:
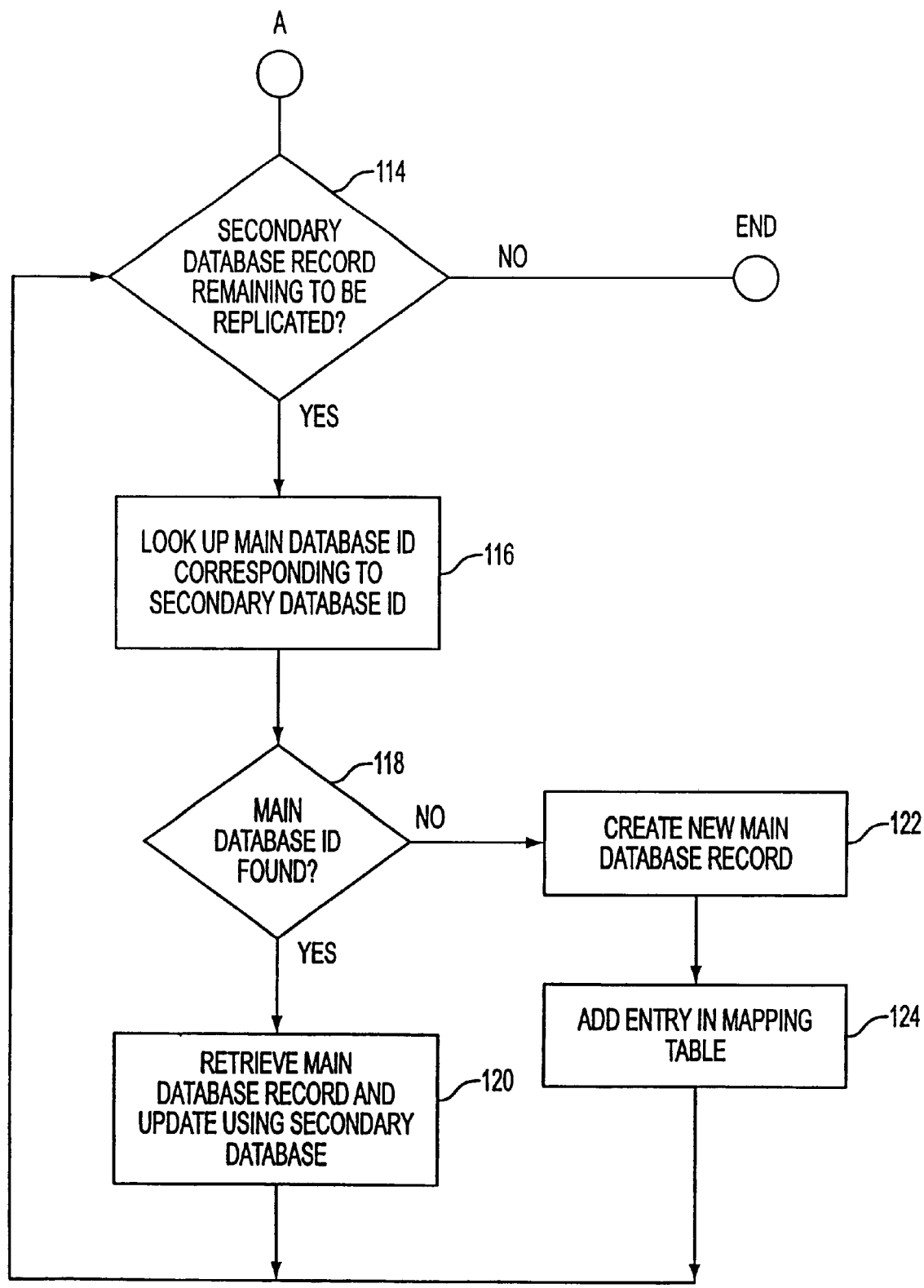

FIGS. 2 and 3 depict a flow diagram of a method of synchronizing data between main database 28 and secondary database 32 according to one embodiment of the present invention. According to this embodiment, a method 100 is provided. In method 100, the first step, step 102, is to check to see if there is a main database document that is remaining to be replicated to secondary database 32. If there are no such main database documents remaining to be replicated, then step 114 is performed as described below.

If, however, a main database document is remaining to be replicated to secondary database 32, the system looks up a secondary database record identification number corresponding to the main database identification record number in step 104. A secondary database identification to main database identification mapping table may be provided, as described in more detail below. This mapping table may be used for looking up correspondence between secondary database identification numbers for a record and main database record identification numbers for a record.

In step 106, the system determines whether a secondary database identification number was found. If a secondary database identification number has not been found, the system recognizes that the main database document has not been created yet within secondary database 32. Accordingly, the system proceeds in step 110 to create a new secondary database record within secondary database 32. Next, in step 112, the system adds an entry in the mapping table corresponding the new secondary database record identification number with the main database record identification number being replicated to secondary database 32. After step 112, the system returns to step 102 to begin the process anew.

If in step 106, a secondary database record identification number is found, the system recognizes that a modification to an already existing secondary database record is to be performed. Accordingly, in step 108 the system retrieves the secondary database record corresponding to the secondary database record identification number that is provided by the mapping table. Also in step 108, the system updates the secondary database record with the new information provided in the main database record from the main database 28. The system then returns to step 102 to determine again whether another main database document remains to be replicated. This process continues until in step 102 it is determined that no other main database documents remain to be replicated. At that point, the system proceeds to step 114.

In step 114, the system determines whether a secondary database record remains to be replicated back to main database 28. If no new records remain to be replicated, then the replication process may end. If, however, additional secondary database records remain to be replicated, the system in step 116 looks up the main database record identification number corresponding to the secondary database record identification number of the next record to be replicated. In step 118, the system determines whether the main database record identification number has been found.

If the main database record identification number has not been found, the system recognizes that a new main database record needs to be created. Accordingly, in step 122, the system creates a new main database record and then in step 124 adds an entry in the mapping table. The system then returns to step 114 to determine whether another second database record remains to be replicated to main database 28.

If in step 118 it is determined that the main database record identification number has been found in the mapping table, the system recognizes that an update to a main database record is to be performed by the system and the system, in step 120, retrieves the main database record and update the record using the secondary database record that has been identified. The system then returns to step 114 to determine whether or not another secondary database record remains to be replicated. When no more secondary database records remain to be replicated, the system ends the replication process.

In both steps 102 and 114. the system determines if there is another document remaining to be synchronized. The system may simply synchronize every record within the database. For example, in step 102, the system may simply go through each main database record that is assigned to the secondary database. Alternatively, the system may keep track of the records that are new or modified since the last synchronization and may proceed through each of these records until all of these records are synchronized. One method involves storing the time and date of synchronization and then synchronizing only those records that have been modified, added or deleted since the stored time and date. This method avoids replicating records to which no changes have been made since the last replication. Other mechanisms and methods for deciding which records to be replicated may also be used according to other methods known to those of ordinary skill in the art.

The methods described with respect to FIGS. 2 and 3 provide a method for replicating and synchronizing data between one database and a subset database. According to another embodiment of the present invention, main database 28 may also be replicated throughout computer system 10 and may comprise multiple replica databases 30. According to this embodiment, secondary database 32 may be synchronized with one or more of replica databases 30 or main database 28.

Figure 4:
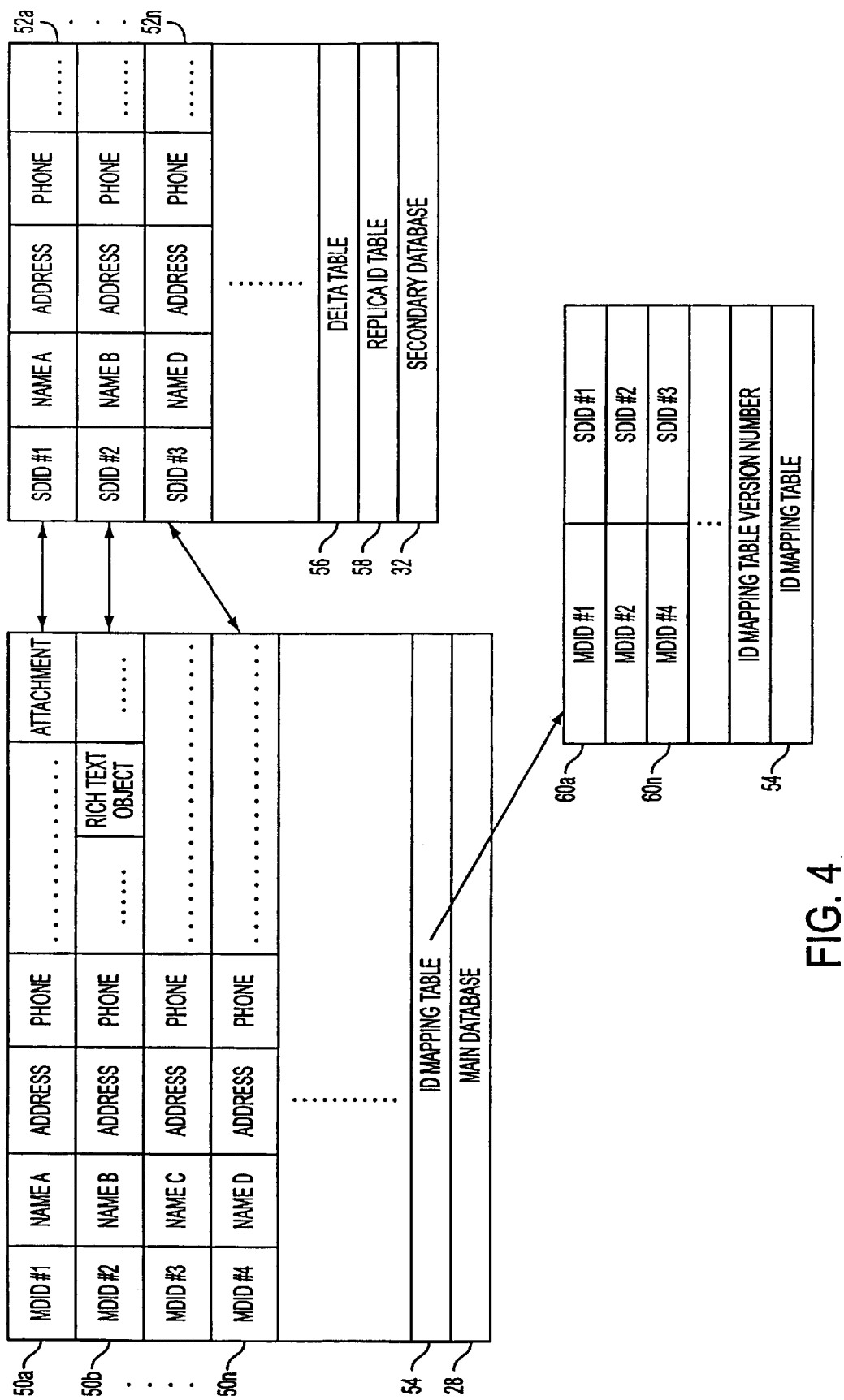
FIG. 4 depicts a database storage structure according to one embodiment of the present invention.
Figure 6A:
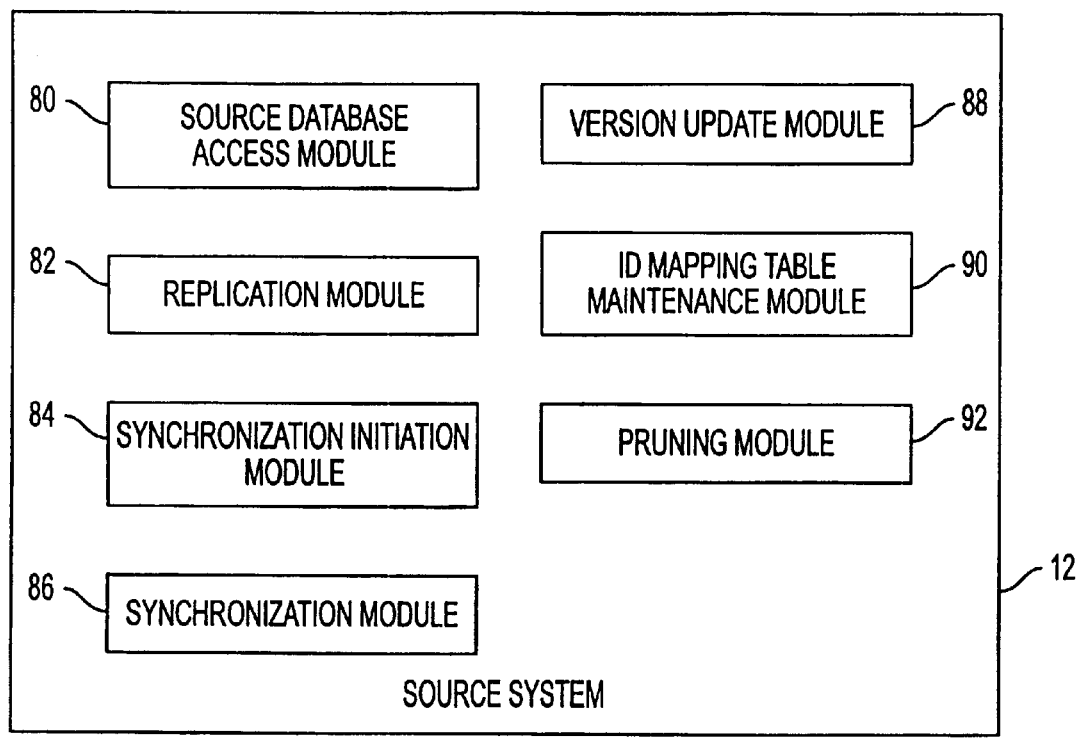
FIG. 6(a) depicts a source system according to one embodiment of the present invention.
Figure 6B:
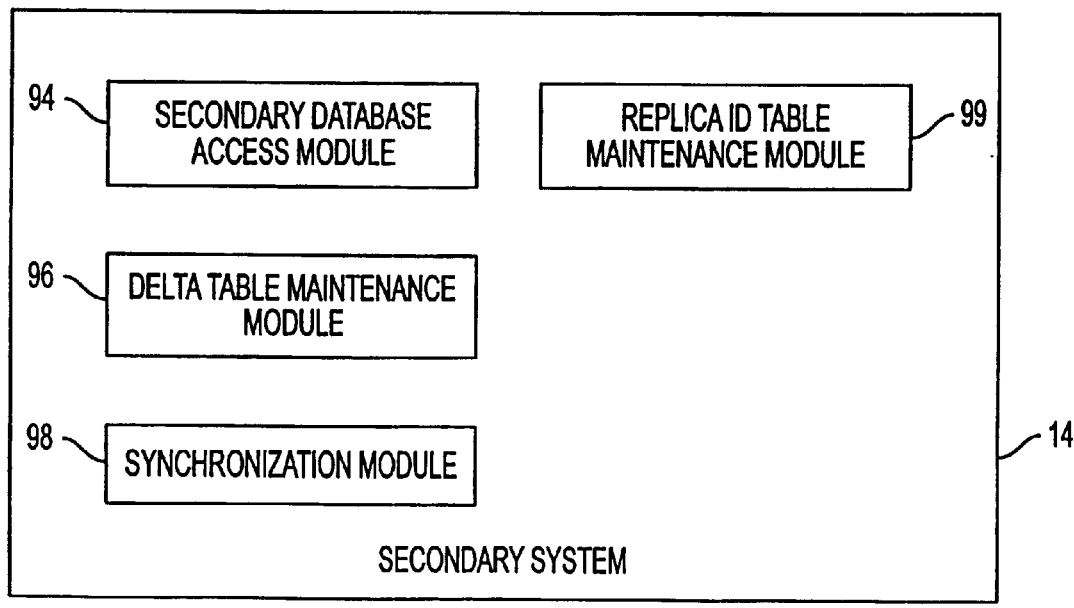
FIG. 6(b) depicts a secondary system according to one embodiment of the present invention.

According to one embodiment of the present invention, as depicted in FIG. 4, main database 28 and secondary database 32 may have a corresponding relationship. For example, secondary database 32 may comprise a subset of information contained in main database 28. For example, main database 28 may comprise a plurality of main database records 50 and secondary database 32 may comprise a plurality of secondary database records 52. As depicted in FIG. 4, each secondary database record 52 of secondary database 32 may correspond to one main database record 50 of main database 28. Secondary database record 52 may comprise one or more of the fields or elements of the main database record 50 to which it corresponds, as depicted in FIG. 4, for example. According to one embodiment of the present invention, a secondary database record 52 may comprise all of the information of its corresponding main database record 50. According to another embodiment of the present invention, main database records 50 may comprise portions, such as attachments, rich text objects, or other information that may not be stored within secondary database 32.

According to one embodiment of the present invention, computer system 10 may comprise a system for identifying records 50 within main database 28. For example, a main database record identification number may be provided for each record within the main database 28. Secondary database 32 may also have a method for assigning identification numbers to each record within secondary database 32. According to one embodiment, the method used by main database 28 may differ from the method used by secondary database 32. Accordingly, a system for corresponding identification numbers between main database 28 and secondary database 32 may be employed according to an embodiment of the present invention.

According to another embodiment of the present invention, a method is provided for synchronizing a secondary database with a source database. The source database may comprise either a main database 28 or a replica database 30 of a distributed database system. At any particular time, replica database 30 may differ from main database 28. Also, each different replica database 30 may differ amongst themselves. For example, replicas 30 may differ prior to replication between them. Accordingly, system 10 ensures that secondary databases 32, main database 28 and replica databases 30 may be synchronized without losing data and maintaining integrity of the databases.

As an example, a main database may be stored on a user's computer. A replica database 30 may be stored on the user's notebook computer. Further, the user may have a secondary database 32 stored on an electronic device. The user may desire to update or synchronize data with the notebook computer rather than the main computer. For example, the user may be on travel and may be unable to access the main computer.

According to this embodiment of the present invention, an identification mapping table 54 may be provided. Identification mapping table 54 may comprise a plurality of entries, each entry of which contains a main database record identification number and a secondary database record identification number pairing. Each identification number for each main database record 50 and each secondary database record 52 may be unique. For example, main database record identification number may comprise a 16 byte long unique identifier. Further, secondary database record identification number may be a 4 byte number. Accordingly, each entry of identification mapping table may comprise 20 bytes, 16 bytes of which correspond to the main database record identification number and 4 bytes of which correspond to the secondary database record identification number. Other sizes may also be provided.

Identification mapping table 54 may be stored on one or more of source systems 12. For example, identification mapping table 54 may be stored in main database 28. Although other locations within computer system 10 may also be provided for storing identification mapping table 54. Further, identification mapping table 54 may also be stored in each replica database 30. Replication of main database 28 with replica databases 30 thereby may also replicate identification mapping table 54 so that each replica database 30 has an up-to-date copy of the identification mapping table. Identification mapping table 54 may be stored anywhere within computer system 10 that is available for synchronizing as described in more detail below. ID mapping table 54 may also be used for synchronizing data between a main database and a secondary database.

Also, according to this embodiment, a delta table may be provided. Delta table 56 may comprise a database structure which contains entries 62 for each corresponding record mapping between main database 28 and secondary database 32. Each entry 62 within delta table 56 may comprise the main data base identification number, the secondary database record identification number, and an action flag as depicted in FIG. 5(a) for example.

Additionally, a replica identification table 58 may be provided. Replica id table 58 may comprise an entry 64 for each replica database 30 and an entry for main database 28. Each entry 64 within replica identification table 58 may comprise a replica name, an identification mapping table version number, and the time of the last synchronization occurring between secondary database 32 and the particular replica database 30 or main database 28. The identification mapping table version number may represent the version of the identification mapping table stored in the replica during the last synchronization between the secondary database 32 and the particular replica for this entry.

Delta table 56 and replica identification table 58 may be stored on secondary database 32. Accordingly, for each synchronization to be made between a secondary database 32 and either main database 28 or a replica database 30, the delta table 56 and replica identification table 58 for that secondary database 32 are available for that synchronization process.

A system and method for synchronizing a secondary database 32 and a distributed database system comprising main database 28 and one or more replica databases 30 is described with reference to FIGS. 6–11.

According to one embodiment of the present invention, source system 12 may comprise a plurality of modules. Source system 12 may comprise a source database access module 80, a replication module 82, a synchronization initiation module 84, a synchronization module 86, a version update module 88, an identification mapping table maintenance module 90, and a pruning module 92. According to one embodiment, secondary system 14 may comprise a secondary database access module 94, a delta table maintenance module 96, a synchronization module 98, and a replica identification table maintenance module 99. Additionally, as depicted in FIG. 4 and FIG. 1, main database 28 may store an identification mapping table 54 and secondary database may store delta table 56 and replica identification table 58. Main database 28 and one or more replica databases 30 may be accessible by one or more source systems 12. Additionally, secondary database 32 may be assessable by one or more secondary systems 14.

Source database access module 80 may comprise a module for enabling source system 12 to access the contents of a source database. Again, a source database may comprise main database 28 or one or more replica databases 30. Replication module 82 may comprise a module that allows replication of data between one source database and another source database such as between main database 28 and one or more of replica databases 30.

Synchronization initiation module 84 may comprise a module that initiates synchronization between a source database and a secondary database 32. According to one embodiment of the present invention, synchronization initiation module 84 may comprise a user interface that enables a user to select when synchronization is to occur. Additionally, synchronization initiation module may have an automatic feature that enables automatic synchronization of data between one or more databases on computer system 10. Synchronization module 86 may comprise a module responsible for synchronizing data between a source database and a secondary database 32 according to one embodiment of the present invention as described in more detail below.

Version update module 88 may comprise a module responsible for updating version numbers within replica identification table 58. Additionally, identification mapping table maintenance module 90 may comprise a module responsible for creating and maintaining identification mapping table 54 within one or more of the source databases. Further, pruning module 92 may comprise a module responsible for pruning entries within delta table 56 and replica identification table 58.

According to another embodiment of the present invention, version update module 88 and pruning module 92 may also reside within secondary system 14 or on both source system 12 and secondary system 14. Also, version update module 88 and pruning module 92 may reside elsewhere within computer system 10.

Figure 7:
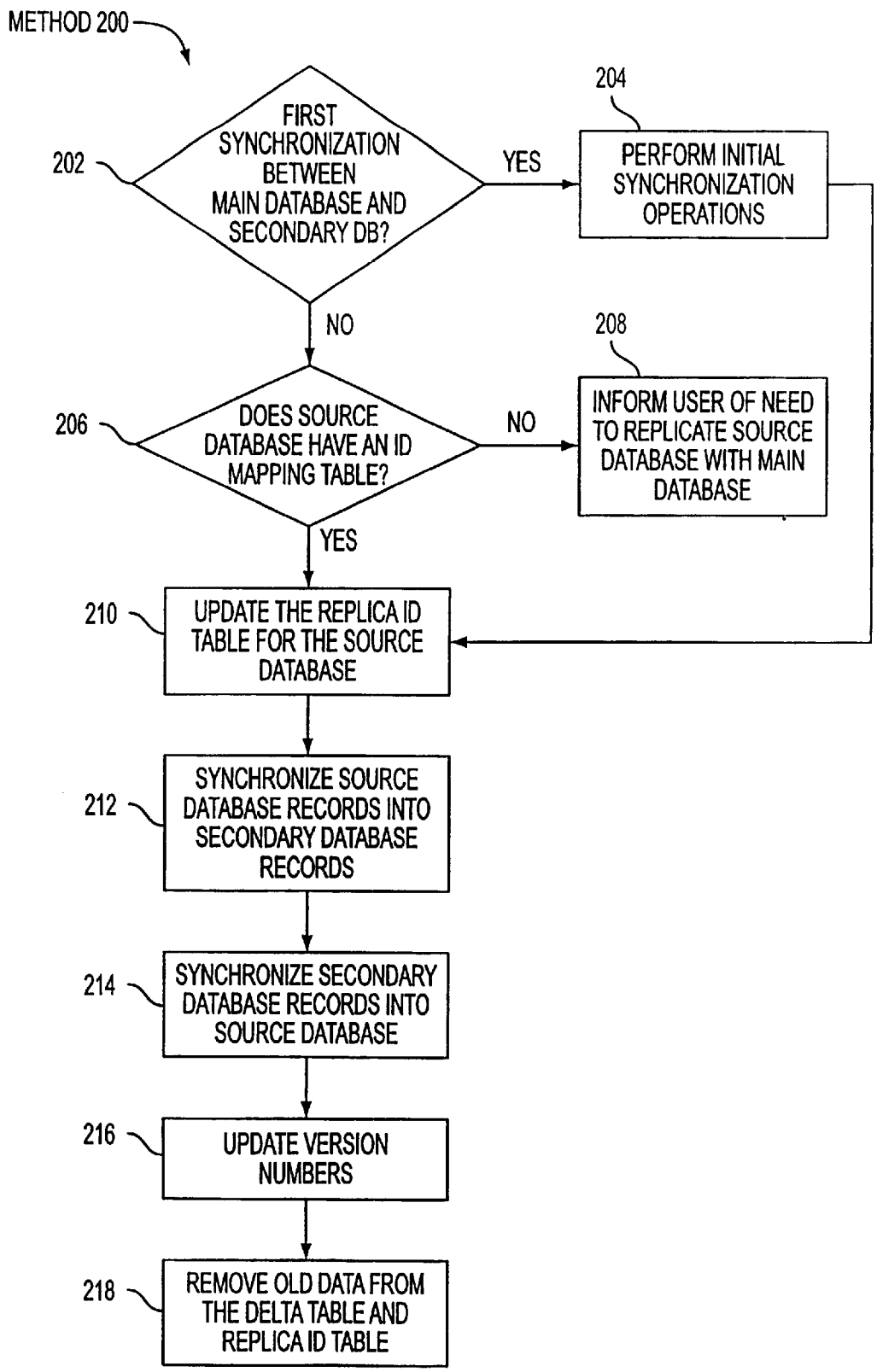
FIG. 7 depicts a flow diagram of a method of synchronization according to another embodiment of the present invention.
Figure 8:
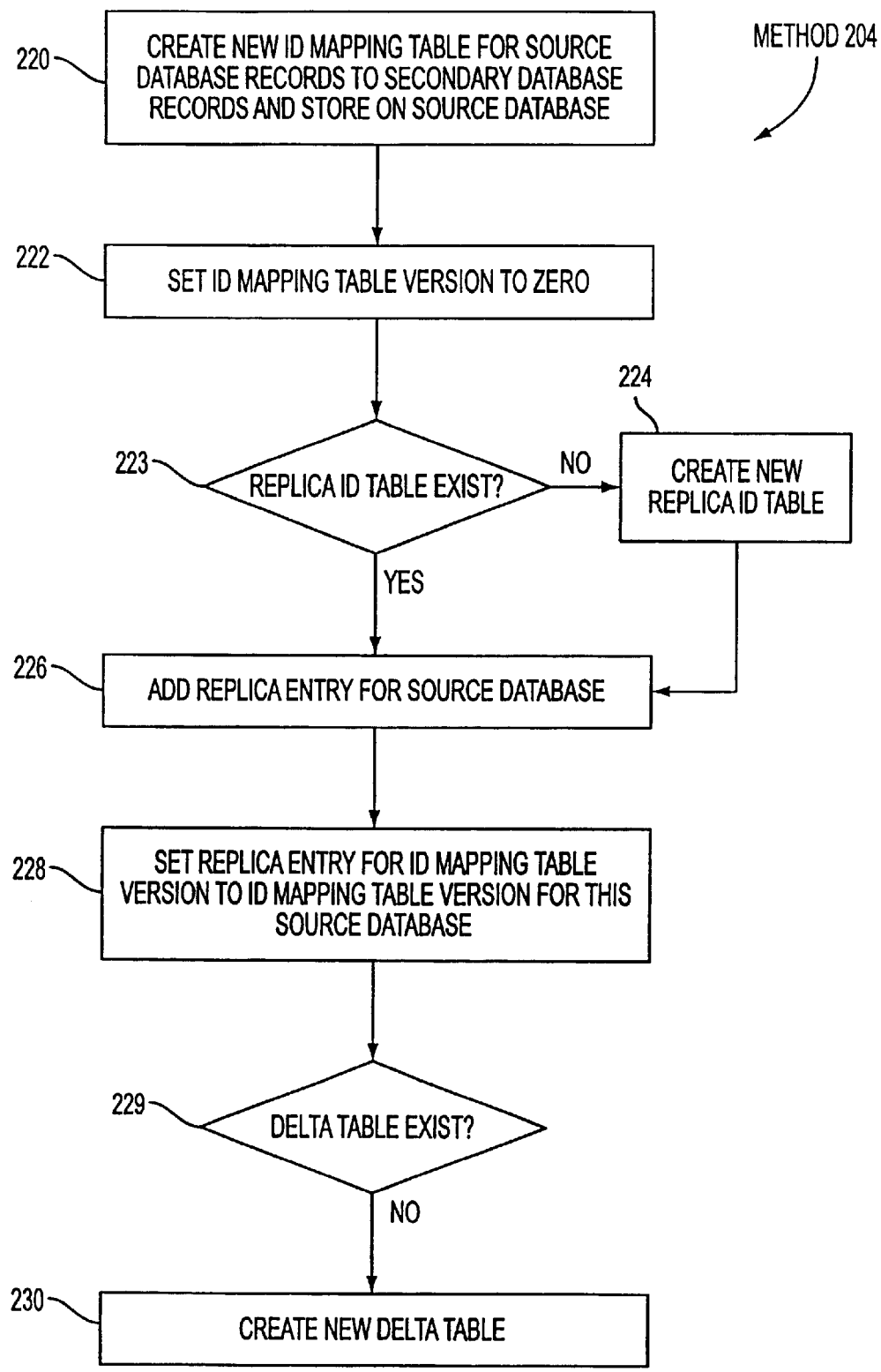
FIG. 8 depicts a flow diagram of a method of initial synchronization according to one embodiment of the present invention.

A method 200 for synchronizing secondary database 32 with a distributed database system may be provided as depicted in FIG. 7. In step 202, synchronization modules 86 and 98 cooperate to determine whether synchronization has taken place between the secondary database 32 and the main database 28 (or any of the related replica databases 30). Step 202 may be performed by determining whether an identification mapping table 54 between main database 28 and secondary database 32 resides within main database 28. Additionally, it may be determined whether a replica identification table 58 is stored within secondary database 32. If an identification mapping table 54 and a replica identification table 58 do not exist, synchronization modules 86 and 98 may determine that synchronization has not taken place between secondary database 32 and main database 28 (or one of replica databases 30) and therefore may proceed to step 204. If the system determines that the synchronization requested is not the first synchronization between main database 28 (or replica databases 30) and secondary database 32, system may proceed to step 206. In step 204, initial synchronization operations may be performed as depicted in more detail with respect to FIG. 8. Step 204 may also be performed by synchronization modules 86 and 98.

In step 206, the system determines whether the source database with which the secondary database is to be synchronized has an identification mapping table 54 stored therein. Step 206 may be performed because, although synchronization may have occurred between secondary database 32 and main database 28, replication of identification mapping table 54 stored within main database 28 may not yet have been made with one or more of replica databases 30. If for example, the secondary database 32 does not contain a replica identification table. Accordingly, if a user attempts to synchronize data between secondary database 32 and a replica database 30 that does not have an identification mapping table 54, synchronization may not be possible. If it is determined that the source database with which synchronization is to occur, does not have an identification mapping table 54, in step 208, the system may prompt the user of the need to replicate the source database with the main database 28.

If, however, the source database has an identification mapping table 54, then the system proceeds to step 210. In step 210, synchronization modules 86 and 98 directs replica identification table maintenance module 99 to update replica identification table 58 so that the replica entry corresponding to the source database with which synchronization is taking place, indicates the time of the synchronization being performed and the version number of identification mapping table 54 being used. The identification mapping table version number may be a number that is assigned by identification mapping table maintenance module 90 within source system 12 as described in more detail below.

Next, the system proceeds to step 212 to synchronize source database records into the secondary database records.

Next, system 10 proceeds in step 214 to synchronize secondary database records into the source database records. Steps 212 and 214 may be performed by synchronization modules 86 and 98.

In step 216, the system updates the version numbers associated with the identification mapping table and the replica identification table. Step 216 may be performed by version update module 88 in cooperation with identification mapping table maintenance module 90 and replica identification table maintenance module 99. Finally, in step 218, the system removes old data from delta table 56 and replica identification table 58. Step 218 may be performed by pruning module 92 in cooperation with delta table maintenance module 96 and replica identification table module 99.

Figure 9:
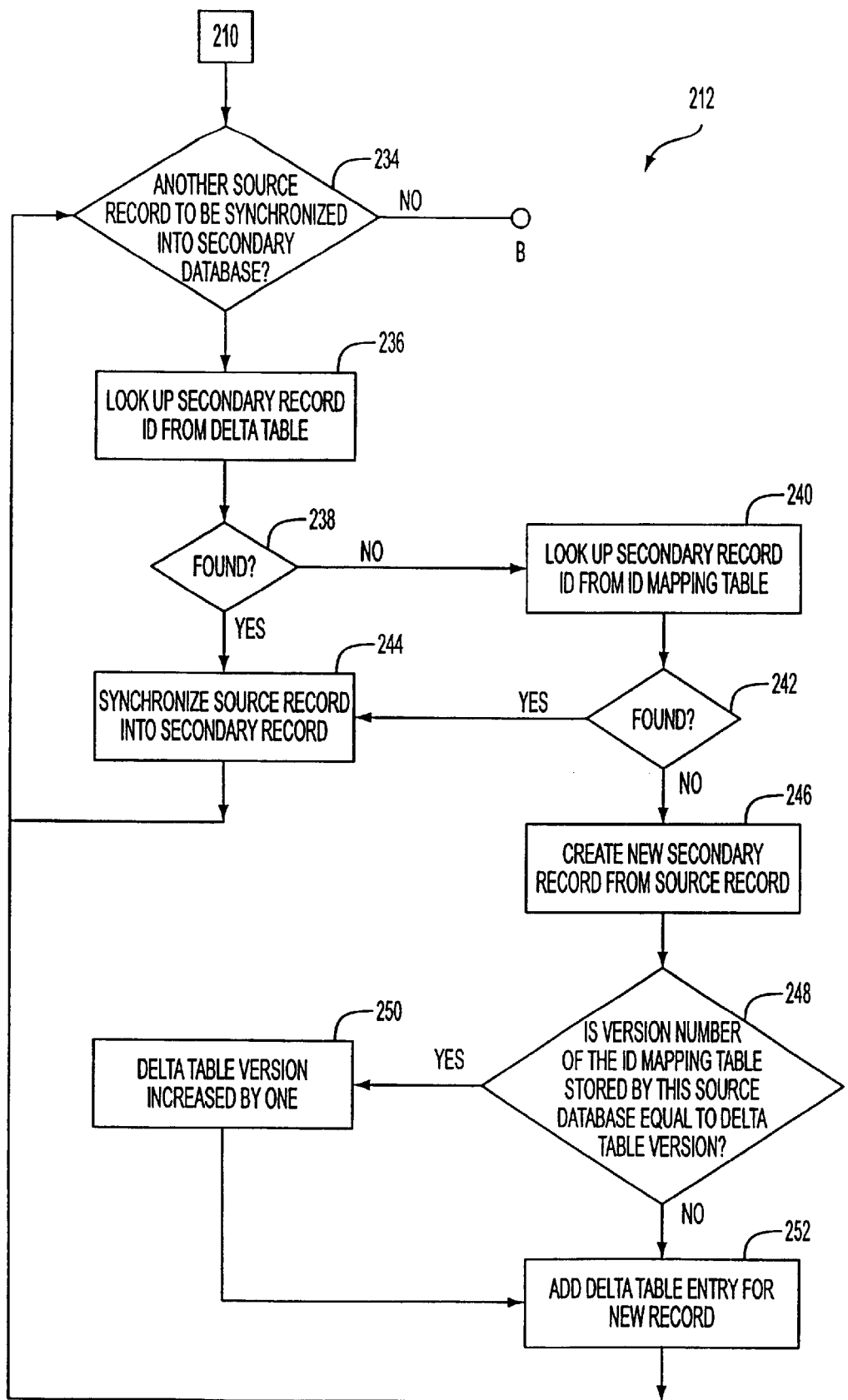
FIG. 9 depicts a flow diagram of a method of synchronizing a new source database into a secondary database according to one embodiment of the present invention.

Step 212 is described in more detail with respect to FIG. 9. Step 214 is described in more detail with respect to FIG. 10. And steps 216 and 218 are described in more detail with respect to FIG. 11.

Step 204 may comprise one or more steps to initialize synchronization between a secondary database 32 and one or more source databases. In step 220, the system may create a new identification mapping table for this source database and secondary database combination and store the new identification mapping table on the source database. The identification mapping table may then be replicated to the other source databases within the distributed database system. Next, in step 222, the identification tables mapping table version number may be set to zero. The identification mapping table version number may be a number associated with each identification mapping table on the system. Accordingly, in step 222, this source databases version of the identification mapping table may be set to zero for initialization purposes.

In step 223, the system determines whether a replica identification table exists within this secondary database 32. If not, then the system may create a new replica identification table and store that within the secondary database 32 in step 224. If it exists, or after step 224, next, in step 226, a replica entry may be entered for this source database in the replica identification table. Specifically, the replica entry may contain the replica identification number for this particular source database, the current time, and the identification mapping table version number stored for this source database. This information may be used for tracking when synchronization between this secondary database 32 and this particular source database last occurred. Additionally, this information establishes the version number of the identification mapping table that existed at the time of the synchronization.

Next, in step 228, the system may set the replica entry for the identification mapping table version equal to the identification mapping table version number for the source database being synchronized. In step 229, the system determines whether a delta table exists yet. If not, then in step 230, the system may create a new delta table for correspondence between this secondary database and this source database and may store that delta table within secondary database 32. Steps 222 through 230 may be performed to initialize the various tables for corresponding a particular secondary database with a source database within the distributed database system. Other methods for initializing these tables may also be used and the order of performing these steps may be altered corresponding to the needs of the system.

After completion of initial synchronization in step 204, synchronization may proceed to step 210. As described briefly above, step 210 may comprise updating the replica identification table stored within this particular source database. Specifically, the system may retrieve the identification mapping table version number for this source database and may store that number within the replica entry of the replica identification table to indicate the version with which this secondary database was synchronized. The time of the synchronization may also be updated within the replica identification table for the entry corresponding with this source database.

According to one embodiment of the present invention, step 212 may comprise a plurality of steps as, for example, depicted in FIG. 9. According to this embodiment of the present invention, step 234 involves determining whether another source record to be synchronized into the secondary database exists. If it is determined that no additional source records are needed to be synchronized into the secondary database, then the system proceeds to step 214. If another source record does need to be synchronized into the secondary database, then the system proceeds in step 236 to look up the secondary record identification number. According to one embodiment of the present invention, the system may first look for the secondary record identification number from delta table 54 stored within the secondary database being replicated. In step 234, if the secondary record identification number is found within the delta table, then the system proceeds to step 244. If the secondary record identification number is not found within the delta table, then the system must proceed to look for the secondary record identification number from the identification mapping table located within the source database in step 240. If the secondary record identification number is found in the identification mapping table in step 242, then the system proceeds to step 244. Otherwise, the system proceeds to step 246.

In step 244, the system synchronizes the source record into the secondary record by copying appropriate fields from the source record into appropriate fields within the secondary record. Methods for synchronizing one database record with another database record are known and such systems may be used according to the present invention. After synchronizing that source record into that secondary database record, the system returns to step 234 to determine whether another source record needs to be synchronized.

In step 246, if the secondary record identification number has not been found in either the delta table or the identification mapping table, the system creates a new secondary record from the source record and stores the new secondary database record within secondary data base 32. Step 246 may comprise creating a new record entry within secondary data base 32 and transferring appropriate fields from the source record being replicated into the secondary record. A method for transferring source record fields to secondary record fields may proceed according to known methods for transferring information from one database to another.

Next, in step 248, the system determines whether the database version number is equal to the highest identification mapping table version number for any replica in replica identification table 58. If not, then in step 252, the system adds a delta table entry for the new record. If so, before adding a new table entry, the delta table version number is increased by one and then a new entry is created in the identification mapping table for this new secondary record. The entry contains the corresponding secondary database record identification number and the main database identification record ID number.

Step 248 may be performed so the delta table version number does not exceed the one plus the highest identification mapping table version number of any replica on the system. By performing this check, the delta table version number does not continue to grow beyond when the secondary database 32 is synchronized a number of times with an out-of-data replica database. Therefore, the delta table version number may represent the version number of the collective identification mapping table from main database 28 and all of the replica databases 30 of that main database. By combining the most up-to-date identification mapping table and the delta table, the most accurate identification mapping table for the system is the result. Therefore, the delta table version number may be limited to one more than the version number of the most up-to-date identification mapping table.

After step 250, then the system proceeds in 252 to add a delta table entry for the newly created secondary record. That entry comprises the main database record identification number, secondary database record identification number and the flag indicating that a new record has been added to the delta table since the last replication. After step 252, the system proceeds back to step 234 to determine whether another source record exists that needs to be synchronized into the secondary database 32. If not, then the system proceeds to step 214, as described in more detail below with respect to FIG. 10.

Figure 10:
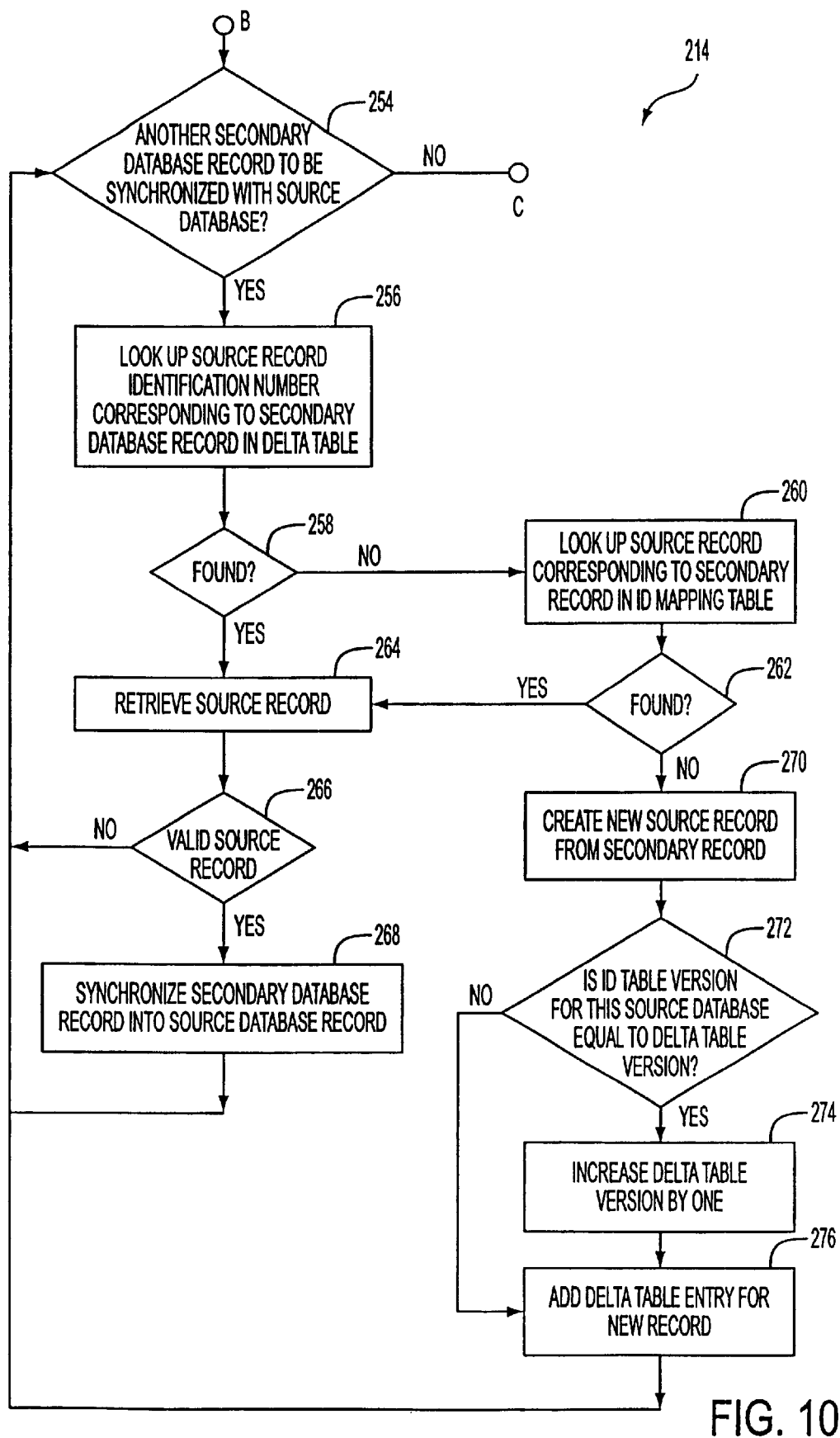
FIG. 10 depicts a flow diagram of a method of synchronizing secondary database modifications with a source database according to one embodiment of to the present invention.

One embodiment of step 214 is depicted in FIG. 10. According to this embodiment, the first step, step 254, involves determining whether another secondary record to be synchronized into the source database exists. If not, the system proceeds to step 216. If another secondary database record exists to be synchronized with the source database, the system looks up the source record corresponding to the secondary database record in the delta table in step 256. If in step 258 the source record identification number is found, then the system retrieves the source record in step 264. If, however, the source record identification number is not found, then the system looks up the source record in the identification mapping table stored within the source database in step 260. In step 262, the system then determines whether or not the source record is found within the identification mapping table of the source database. If the record is found, then the source record is retrieved in step 264. Otherwise, the system creates a new source record based upon the secondary record stored within the secondary database in step 270.

In step 264, if the source record has been found, in step 266 the system determines whether or not the source record is valid within this particular source database. For example, although a particular record may exist within one of the distributed databases, that particular record may not have been replicated to this particular source database. If the source record is not valid within this particular source database, the system recognizes that synchronization of this particular secondary database should not be performed at this time. According to one embodiment, that secondary database record may be saved for a time when synchronization takes place with a source database that has that particular source database record stored therein.

If the source record is valid, then in step 268 synchronization between the secondary record and the source record may take place. As described above, synchronization of fields within a secondary database record and source database record may take place using known techniques for synchronizing fields between databases. After synchronization the system returns into step 254 to determine whether another secondary record exists to be synchronized into the source database.

If a new source record needs to be created in step 270, the system creates a new source record within that particular source database using the fields from the secondary database record. In step 272, the system determines whether the identification table version for this particular source database as stored in the replica identification table is equal to the delta table version stored within the secondary database. If so, then the delta table version number is increased by one in step 274 and then the system proceeds to step 276. Otherwise, the system simply skips step 274 and proceeds directly to step 276 to add a delta table entry for the new record. After adding a delta table entry for the newly created record, the system proceeds to step 254 to determine whether another secondary record exists to be copied.

Figure 11:
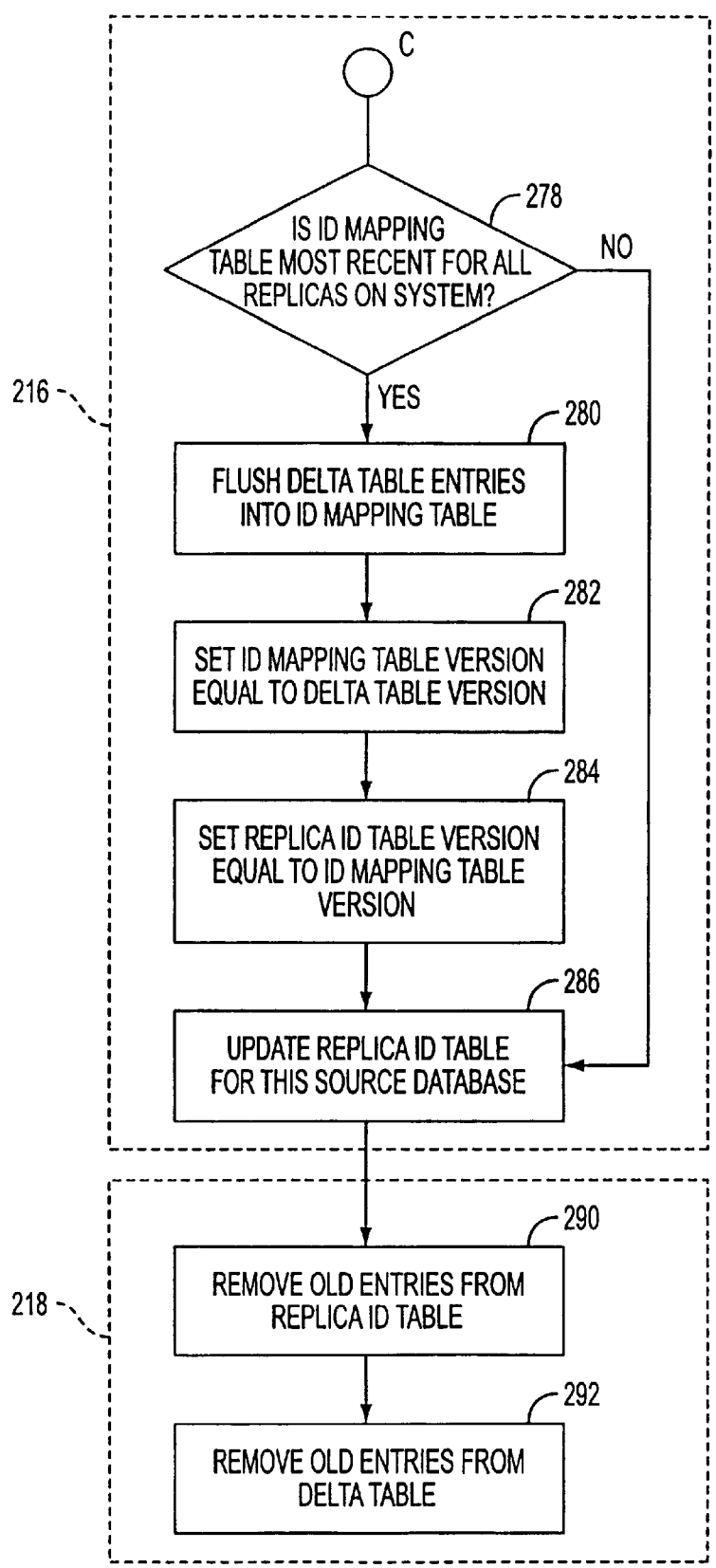
FIG. 11 depicts a flow diagram of a method of managing the delta and replica identification tables according to one embodiment of the present invention.

According to one embodiment of the present invention, method 200 may also comprise steps 216 and 218. Step 216 may be used to update version numbers so as to ensure accuracy and consistency within the various databases. In step 218, old data may be removed from delta table 56 and replica identification table 58 to prevent that information from being stale and also to prevent the size of delta table 56 and replica identification table 58 from growing exceedingly large. The size of delta table 56 and replica identification table 58 is important because they are stored in secondary database 32 which may be stored on a limited memory system such as secondary system 14 according to one embodiment. Step 216, according to one embodiment, may comprise steps 278 through 286 as depicted in FIG. 11.

According to this embodiment, step 278 may comprise determining whether the identification mapping table stored within this source database is the most recent for all of the various replicas on system 10. This step may be performed by comparing the identification mapping table version number for this particular source database as stored within the source database with the highest identification mapping table number stored in the replica identification table stored on the secondary database. If those two version numbers are equal, then the system has determined that the identification mapping table stored within the source database is the most recent version of any on the system. If they are different, then some other source database within the distributed database system contains a more recent version of the identification mapping table. If that is the case, then the system proceeds to step 286 as described below.

If the source database does store the most recent identification mapping table, then the system proceeds to perform steps 280, 282 and 284. In step 280, the system flushes entries from delta table 56 into the identification mapping table. Specifically, the additions and deletions that have taken place to the secondary database have been stored in the delta table of that secondary database. Those entries may now be permanently transferred into the identification mapping table. In step 282, the system then sets the identification mapping table version equal to the delta table version number to indicate that the identification mapping table is not completely up-to-date.

Next, in step 284, the highest identification table version number in the replica identification table is set to be equal to the identification mapping table version number of the source database involved in this synchronization. Next, in step 286, the system updates the replica identification table for this particular source database. According to one embodiment, in step 286, the entry in replica identification table 58 for this particular source database is updated to include the current time of the synchronization and the identification mapping table to version number. After step 286 the system proceeds to perform step 218 which may comprise one or more steps.

According to one embodiment of the present invention, step 218 may comprise steps 290 and 292. Step 290 may comprise removing old entries from the replica identification table. And step 292 may comprise removing old entries from delta table 56. According to one embodiment, steps 290 and 292 may remove entries whose current time exceeds a predetermined time. For example, a period of one year or six months may be used for eliminating old entries within replica identification table 58 and delta table 56. According to another embodiment, in step 292 the system may also scan delta table 56 for entries that correspond to versions of the ID mapping table that no longer exist within the replica identification table and then removes them.

According to one embodiment of the present invention, the secondary system 14 may comprise an electronic device sold under the trade name PalmPilot™ by 3COM or an electronic device sold under the name Workpad™ by IBM. Secondary system 14 may comprise a system utilizing the operating system licensed by Microsoft under the name Windows CE™. Other operating systems may also be used. Source system 12 may comprise a computer system operating in the distributed environment licensed by Lotus Development Corporation under the tradename Lotus Notes™. The Lotus Notes™ system offers a feature called replication, which allows the creation of multiple replicas of a single database. At any time, multiple replicas can be synchronized to maintain consistency between them. Server 20 may comprise a server licensed by Lotus Development Corporation under the tradename Lotus Domino™. According to this embodiment, server 20 allows any source system 12 database to be viewed on the web using any standard HTML browser. Therefore, by supporting robust data synchronization secondary systems 14 and server 20, system 10 may provide for publishing on the web of new content created on secondary systems 14.

Therefore, according to one embodiment, system 10 comprises a database residing on a data storage mechanism 18 accessed by server 20, such as a Lotus Domino™ server. Additionally, replicas of this database may reside on additional source systems 12, such as a notebook computer. For purposes of illustration, main database 28 accessed by server 20 may be referred to as database A and a replica database 30 on a source system 12 may be referred to as database B. A user may regularly make additions, modifications, and deletions to database A, when, for example, the user is operating a source system 12, such as a Notes™ client, connected to server 20. such as a Domino™ server over network 16, such as a high speed LAN. When the user is operating a source system 12 that is disconnected from network 16, such as a notebook computer, the user may work using a replica database 30, database B. The user may later replicate the contents of database B with database A when the user reconnects source system 12 to network 16.

The user may also use secondary system 14, such as a PalmPilot™, which allows more flexibility while traveling. Secondary system 14 may have a secondary database 32 which is a subset of database A. The user then may synchronize information on secondary database 32 with database A by connecting secondary system 14 to network 16.

Synchronization between a PalmPilot™ database and a single Lotus Notes™ database with database A involves correspondence of data within each record in the PalmPilot's™ version of the database with a document within Notes™. The PalmPilot™ database may not contain identical entries as the Notes™ database entries. For example, a Notes™ document may contain attachments, or other rich text objects, which may not be storable on the PalmPilot™.

According to this embodiment of the present invention, a system and method for synchronizing data between a PalmPilot™ and a Lotus Notes™ database system may be provided. Specifically, in one embodiment, the PalmPilot™ may be synchronized with a single database within a Lotus Notes™ system.

According to one embodiment, an identification mapping table 54 may comprise a table that contains a mapping between each PalmPilot™ record identification number and the identification number of the corresponding Notes™ document. Identification mapping table 54 may comprise a table stored in the Notes™ database under the name Id Mapping Table or IMT. The IMT may comprise an entry which contains the Notes™ document unique identification number or UNID and the PalmPilot™ identification number for each corresponding set of records. The UNID may comprise a 16 byte long unique identifier which may include a time-stamp identifying the creation date and time of the document identified in the Notes™ database. Each ITM entry may comprise 20 bytes-16 bytes for the UNID and 4 bytes for the PalmPilot™ record id.

Because space in the PalmPilot™ may be limited, the IMT may be stored on the Notes™ database. For example, if a user desires to synchronize both a Notes™ address book database and a Notes™ calendar database to a PalmPilot™, a large amount of data may be stored on the PalmPilot™. For example, if the user has 20 scheduled events per week, the user will have about 1000 scheduled events per year, thereby requiring 1000 entries in the PalmPilot™ DateBook. Furthermore, suppose that the user's company has about 5000 people, giving the user a PalmPilot™ Address Book with about 5000 entries. On average, each calendar and address book entry may take between about 50 and 100 bytes respectively. Further, each identification mapping may comprise at least 20 bytes. Therefore, the identification mapping table may comprise anywhere from 20 to 40 percent in additional storage space beyond that necessary to store the address book and calendar information on the PalmPilot™. With the above example, the identification mapping table 54 for all those entries in a PalmPilot™ would occupy at least 120 K bytes, over 10% of the total storage space in a PalmPilot™ Profession model.

By storing the IMT as a document in the Notes™ database being synchronized, a significant storage savings is provided. By storing the IMT in the Notes™ database, the system may take advantage of the Notes™ replication engine to propagate updates to the table to all the different replicas, making it possible to synchronize the PalmPilot™ with different replicas of the same database. The IMT may also be stored in any local storage, including the file system according to another embodiment of the present invention.

According to one embodiment, a user may desire to synchronize a PalmPilot™ with a single database, such as database A in the example. Accordingly, method 100 as depicted in FIGS. 2 and 3 may be used according to one embodiment of the present invention. Specifically, for each document, the system first checks to determine whether the Notes™ document's UNID resides in the IMT. If so, the system looks up the corresponding PalmPilot™ record and updates the record accordingly. Otherwise, if the UNID is not found in the IMT, a new record is created on the PalmPilot™ corresponding to the Notes™ document, and a new mapping between the document and the record is added to the IMT. Similarly, if a new record needs to be copied from the PalmPilot to the Notes database, the PalmPilot identification number is searched for in the IMT to see if a corresponding UNID may be located. Table 1 below depicts a specific flow process for this particular embodiment and corresponding to method 100 depicted in FIGS. 2 and 3.

TABLE 1

```
WHILE (notesDoc = next Notes document to be synched) DO
   PilotId = LookupIMT (notesDoc.UNID)
   IF (PilotId) THEN
     pilotDoc = GetPilotDocument(PilotId)
     IF (pilotDoc is valid) THEN
       UpdatePilotRecord (notesDoc, pilotDoc)
   END
   ELSE
     pilotDoc = CreateNewPilotRecord(notesDoc)
     AddIMTEntry (pilotDoc.Id, notesDoc.UNID)
   END
END
WHILE (pilotDoc = next PalmPilot ™ record to be synced) DO
   NotesUNID = LookupIMT(pilotDoc.Id)
   IF (NotesUNID)
     notesDoc = GetNotesDocument (NotesUNID)
     IF (notesDoc) THEN
       UpdateNotesDocument (pilotDoc, notesDoc)
   END
   ELSE
     notesDoc = CreateNewDocument (pilotDoc)
     AddIMTEntry (notesDoc.UNID, pilotDoc.ID)
   END
END
```

According to another specific embodiment of the present invention, the user may desire to synchronize the PalmPilot™ database with distributed database having main database 28 and one or more replica databases 30, including, for example, database B in the example. For example, the user may take a notebook computer having a replica database 30 and a PalmPilot™ having a secondary database away from the office. If the user is unable to connect to the Notes™ database through network 16, the user may desire to synchronize the contents of the secondary database 32 stored on PalmPilot™ with replica database 30 (here databases B) on the notebook computer.

If replica database 30 has not been recently replicated with main database 28, then the process of Table 1 may yield errors if the user later attempts to synchronize with main database 28. For example, the identification mapping table of replica database B may contain an entry for a record that has not been stored on the main database. Also, the system may not detect that certain documents for which no mapping exists in replica database B identification mapping table may have already been created in the Notes™ database (namely in database A). If the user modifies one of those records on the PalmPilot™, the system operating according to Table 1 may cause a new record to be created in replica database B representing that record. When the user later synchronizes databases A and B, the system may end up with two copies of the same record in each database. Furthermore, the IMT in database A would have a conflicting mapping with the IMT in database B regarding this record.

According to another embodiment of the present invention, therefore, delta table 56 (known also at the dT) may be stored on the secondary system 14, such as the PalmPilot™. Each entry in delta table 56 may comprise a PalmPilot™ record identification number, a Notes™ document identification number and an action flag reflecting the type of update to the IMT to which the delta table entry corresponds. During synchronization for each newly created entry in the secondary database, an entry is added to delta table 56 with the appropriate mapping and action flag. Delta table 56 may track the mapping changes that have been made to the secondary database during synchronization with multiple replicas. When synchronizing with a replica which does not contain the most recent IMT, the combination of the information from the dT and the available outdated IMT may be sufficient to construct the equivalent of an updated IMT.

Delta table 56 may be used to synchronize with a database that may not have the most up-to-date IMT. Delta table 56 may grow arbitrarily large with time. To avoid this problem, according to another embodiment of the present invention, system 10 may periodically commit changes in delta table 56 to an updated IMT and then prune old delta table entries that have already been propagated to all of the relevant replicas of the IMT. To keep track of which replicas are still relevant, and how current each replica's version of the IMT is, a Replica ID Table (RIT) may be stored in the PalmPilot™ database. The RIT contains an entry for each replica, and each entry has the replica's most recent IMT version number found by the system, as well as the time indicating when the last synchronization session between the PalmPilot™ and that replica occurred. To determine which changes in delta table 56 apply to a particular version of the IMT, the entries in delta table 56 may be categorized by the IMT version to which that entry applies.

The system may prune delta table entries that have already been propagated to all of the replica database 30 on the system. Therefore, delta table 56 may be pruned by eliminating entries having an IMT version number lower than the lowest IMT version indicated in the RIT.

Another potential problem may arise if the user were to stop synchronizing with a particular replica which has an entry in the RIT. In such a case, the delta table may grow arbitrarily large because the IMT version number of that replica's IMT would not increase in the RIT, preventing the delta table 56 from being pruned. According to another embodiment of the present invention, each RIT entry may comprise a timestamp. During synchronization, if an RIT entry has not changed for a long period of time, that entry may be removed from the RIT, allowing delta table 56 to be pruned of entries which were maintained because of this outdated replica. The length of time to maintain an RIT entry may be predetermined or may be set by a user. For example, one year or less may be used.

According to another embodiment of the present invention, table 2 below depicts a flow sequence for synchronization between a PalmPilot™ and a Notes™ distributed database system.

TABLE 2

```
10   IF (IMT does not exist) AND (RIT does not exist) THEN
20      IMT = New IMT
30      IMT.Version = 0
40      RIT = NewRIT
50      RIT.Add(Replicald, CurrentTime, IMT.Version)
60      RIT.IMTVersion = IMT.Version
70      dT = New dT
80      dT.Version = IMT.Version
90   END
100  IF (IMT does not exist) AND (RIT is not empty) THEN
110     DialogBox "Please replicate this database prior to first
        synchronization."
120     RETURN
130  END
140  RIT.UpdateEntry(ReplicaID, IMT.Version)
150  WHILE (notesDoc = next document to be synched) DO
160     PilotId = dT.Lookup(notesDoc.UNID)
170     IF (PilotId is NOT valid) THEN
180        PilotID = IMT.Lookup(notesDoc.UNID)
190     END
```

TABLE 2-continued

```
200     IF (PilotId) THEN
210         pilotDoc = GetPilotDocument(PilotId)
220         IF (PilotDoc is valid) THEN
230             UpdatePilotRecord (notesDoc, pilotDoc)
240         END
250         ELSE
260             pilotDoc = CreateNewRecord(notesDoc)
270             IF (RIT.IMTVersion = dT.Version) THEN
280                 dT.Version = dT.Version+ 1
290             END
300             dT.Add(pilotDoc.ID, notesDoc.UNID)
310         END
320     END
330     WHILE (pilotDoc = next record to be synched) DO
340         NotesUNID = dT.Lookup(pilodDoc.ID)
350         IF (NotesUNID is NOT valid) THEN
360             NotesUNID = IMT.Lookup(pilotDoc.ID)
370         END
380         IF (notesDocUNID) THEN
390             notesDoc = database.GetDocument(notesDocUNID)
400             IF (notesDoc is valid) THEN
410                 UpdateNotesDocument (notesDoc, pilotDoc)
420             ELSE
430                 //Do nothing. Document doesn't exist yet in this replica!
440             END
450         ELSE
460             notesDoc = CreateNewDocument(pilotDoc)
470             IF (RIT.IMTVersion = dT.Version) THEN
480                 dT.Version = dT.Version + 1
490             END
500             dT.Add(pilotDoc.ID, notesDoc.UNID)
510         END
520     END
530     IF(IMT.Version=RIT.IMTVersion) and dT.Version >1 THEN
540         dT.Flush(IMT)
550         IMT.Version = dT.Version
560         RIT.IMTVersion = IMT.Version
570     END
580     RIT.UpdateEntry(ReplicaID), CurrentTime, IMT.Version)
590     RIT.RemoveOldEntries()
600     dT.RemoveOldEntries()
```

In lines 10 through 90 initiation steps are performed. New IMT, dT and RIT tables are created and initialized. Lines 100 to 130 may be performed when no IMT exists. In line 140, the IMT is retrieved from the database and the RIT entry for this replica is updated because the replica may now contain a more up-to-date version of the IMT due to having replicated with other replicas in the system. Lines 150 through 320 take care of synchronizing any new or modified Notes™ documents to the PalmPilot™.

In lines 270 through 290, the delta table version number is increased. According to one embodiment, the delta table version number may be limited to the RIT version number plus one, where the RIT version number represents the highest version number of any IMT in all of the replicas. The delta table version number may be the version number of the global IMT. Lines 330 through 520 synchronize any new or modified PilotPalm™ records to the Notes™ database. If a record is present in another replica, but not the one being synchronized, during a subsequent synchronization, with a replica having that record, the system may add the change to the replica. Lines 530 through 600 bring all the version numbers up to date, and remove any old data from delta table 56 and RIT 58. Line 530 checks whether the IMT in the current replica is in fact the same as the most up to date IMT anywhere in the system by comparing the IMT version number to the RIT version number. If the IMT is in fact older, then modifications may be maintained in the delta table until an up to date replica is found. If the IMT is up to date, any new additions to the delta table 56 may be stored in the IMT, and the IMT and RIT version numbers may be incremented. Line 580 updates the RIT entry for this replica, by time stamping it with the current time, and by updating the version number (which may have been incremented in line 550). Line 590 invokes a routine that iterates over the RIT, and removes any entries with a time stamp older than the limit for how long to maintain information about a replica. Line 600 invokes a similar routine which scans delta table 56 for any entries that pertain to versions of the IMT that no longer occur in the RIT, and removes them.

Other embodiments and uses of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A system for synchronizing data between one or more secondary systems and a distributed system comprising:

a distributed database system comprising one or more main databases and one or more replica databases, the one or more main databases comprising a plurality of main database records, and the one or more replica databases comprising plurality of replica database records;

one or more secondary databases provided on a secondary database systems connectable to the distributed database system, wherein the one or more secondary databases comprise a plurality of secondary database records, each secondary database record corresponding to the corresponding at least one main database record and at least one replica database record;

at least one modification database stored on the one or more secondary systems, the modification database comprising an entry corresponding to the main database record, the replica database record, and the corresponding secondary database record, the entry further comprising an update indicator for indicating whether the record has been updated since a prior synchronization between the one or more main, replica and secondary databases;

at least one identification database comprising an identification number and a version number for each main, replica and secondary database record, wherein the identification database maps at least two records of the main, replica and secondary database records using the identification numbers and the version numbers; and one or more synchronization modules that synchronize records in the one or more main, replica and secondary databases with the distributed database system using the mapped records in the identification tables.

2. The system of claim 1 further comprising a source computer system connected to the distributed database system and wherein the secondary computer comprises less memory than the source computer system.

3. The system of claim 2 wherein the secondary computer is a palmtop electronic device.

4. The system of claim 1 wherein the secondary database and the distributed database system comprise different data storage formats.

5. The system of claim 1, wherein the main database identification number and the secondary identification number are unique.

6. The system of claim 1, wherein the main database identification number comprises sixteen (16) bytes.

7. The system of claim 1, wherein the secondary identification number comprises four (4) bytes.

8. A system for synchronizing data between one or more secondary systems and a distributed system comprising:

a distributed database means comprising one or more main databases and one or more replica databases, the one or more main databases comprising a plurality of main database records, and the one or more replica databases comprising plurality of replica database records;

one or more secondary databases provided on a secondary database systems connectable to the distributed database system, wherein the one or more secondary databases comprise a plurality of secondary database records, each secondary database record corresponding to the corresponding at least one main database record and at least one replica database record;

at least one modification database stored on the one or more secondary systems, the modification database comprising an entry corresponding to the main database record, the replica database record, and the corresponding secondary database record, the entry further comprising an update indicator for indicating whether the record has been updated since a prior synchronization between the one or more main, replica and secondary databases;

at least one identification database comprising an identification number and a version number for each main, replica and secondary database record, wherein the identification database maps at least two records of the main, replica and secondary database records using the identification numbers and the version numbers; and one or more synchronization means that synchronize records in the one or more main, replica and secondary databases with the distributed database system using the mapped records in the identification tables.

9. The system of claim 8 further comprising a source computer means connected to the distributed database means and wherein the secondary computer means comprises less memory than the source computer means.

10. The system of claim 9 wherein the secondary computer means comprises a palmtop electronic device.

11. The system of claim 8 wherein the secondary database and the distributed database system comprise different data storage formats.

12. The system of claim 8, wherein the main database identification number and the secondary identification number are unique.

13. The system of claim 8, wherein the main database identification number comprises sixteen (16) bytes.

14. The system of claim 8, wherein the secondary identification number comprises four (4) bytes.

15. A method for synchronizing data between one or more secondary systems and a distributed system, the method comprising:

providing a distributed database system comprising one or more main databases and one or more replica databases, the one or more main databases comprising a plurality of main database records, and the one or more replica databases comprising plurality of replica database records;

providing one or more secondary databases on a secondary database systems connectable to the distributed database system, wherein the one or more secondary databases comprise a plurality of secondary database records, each secondary database record corresponding to the corresponding at least one main database record and at least one replica database record;

providing at least one modification database stored on the one or more secondary systems, the modification database comprising an entry corresponding to the main database record, the replica database record, and the corresponding secondary database record, the entry further comprising an update indicator for indicating whether the record has been updated since a prior synchronization between the one or more main, replica and secondary databases;

providing at least one identification database, the identification database comprising an identification number and a version number for each main, replica and secondary database record, wherein the identification database maps at least two records of the main, replica and secondary database records using the identification numbers and the version numbers; and utilizing one or more synchronization modules that synchronize records in the one or more main, replica and secondary databases with the distributed database system using the mapped records in the identification tables.

16. The method of claim 15, wherein the main database identification number and the secondary identification number are unique.

17. The method of claim 15, wherein the main database identification number comprises sixteen (16) bytes.

18. The method of claim 15, wherein the secondary identification number comprises four (4) bytes.

19. A processor readable medium having code embodied therein for synchronizing data between one or more secondary systems and a distributed system, the medium comprising:

code for causing a processor to access a distributed database system comprising one or more main databases and one or more replica databases, the one or more main databases comprising a plurality of main database records, and the one or more replica databases comprising plurality of replica database records;

code for causing a processor to access one or more secondary databases on a secondary database systems connectable to the distributed database system, wherein the one or more secondary databases comprise a plurality of secondary database records, each secondary database record corresponding to the corresponding at least one main database record and at least one replica database record;

code for causing a processor to access at least one modification database stored on the one or more secondary systems, the modification database comprising an entry corresponding to the main database record, the replica database record, and the corresponding secondary database record, the entry further comprising an update indicator for indicating whether the record has been updated since a prior synchronization between the one or more main, replica and secondary databases;

code for causing a processor to access at least one identification database, the identification database comprising an identification number and a version number for each main, replica and secondary database record, wherein the identification database maps at least two records of the main, replica and secondary database records using the identification numbers and the version numbers; and code for causing a processor to utilize one or more synchronization modules that synchronize records in the one or more main, replica and secondary databases with the distributed database system using the mapped records in the identification tables.

20. The medium of claim 19, wherein the main database identification number and the secondary identification number are unique.

21. The medium of claim 19, wherein the main database identification number comprises sixteen (16) bytes.

22. The medium of claim 19, wherein the secondary identification number comprises four (4) bytes.

* * * * *